United States Patent
Croxford et al.

(10) Patent No.: US 9,472,008 B2
(45) Date of Patent: Oct. 18, 2016

(54) GRAPHICS TILE COMPOSITING CONTROL

(71) Applicant: ARM Limited, Cambridge (GB)

(72) Inventors: Daren Croxford, Cambridge (GB); Thomas James Cooksey, Cambridge (GB); Sean Tristram Ellis, Cambridge (GB)

(73) Assignee: ARM Limited, Cambridge (GB)

( * ) Notice: Subject to any disclaimer, the term of this patent is extended or adjusted under 35 U.S.C. 154(b) by 121 days.

(21) Appl. No.: 14/309,487

(22) Filed: Jun. 19, 2014

(65) Prior Publication Data

US 2015/0049118 A1    Feb. 19, 2015

(30) Foreign Application Priority Data

Aug. 14, 2013   (GB) .................................. 1314556.0

(51) Int. Cl.
  *G06T 11/60*  (2006.01)
  *G06T 11/40*  (2006.01)
  *G06T 15/00*  (2011.01)

(52) U.S. Cl.
  CPC ............... *G06T 11/60* (2013.01); *G06T 11/40* (2013.01); *G06T 15/005* (2013.01)

(58) Field of Classification Search
  None
  See application file for complete search history.

(56) References Cited

U.S. PATENT DOCUMENTS

| 5,867,166 A | 2/1999 | Myhrvold et al. |
| 2007/0040851 A1 | 2/2007 | Brunner et al. |
| 2013/0063473 A1 | 3/2013 | Pelton et al. |
| 2014/0072244 A1* | 3/2014 | Cheng ............... G06F 17/30247 382/306 |

FOREIGN PATENT DOCUMENTS

EP   0 961 230   12/1999

OTHER PUBLICATIONS

Ford et al.; "Colour Space Conversions;" Aug. 1998; 31 pages; distributed and passively maintained by Charles Poynton (poynton@poynton.com).*
International Search Report and Written Opinion of the International Searching Authority dated Sep. 22, 2014 in PCT/GB2014/051847, 10 pages.
Khan, M.H. et al., "Bandwidth-efficient Display Controller for Low Power Devices in Presence of Occlusion", IEEE, (2007), 2 pages.
U.S. Appl. No. 15/067,683, filed Mar. 11, 2016, Inventor: Croxford et al.

* cited by examiner

Primary Examiner — Edward Martello
(74) Attorney, Agent, or Firm — Nixon & Vanderhye P.C.

(57) ABSTRACT

A graphics processing apparatus performs tile based compositing operations. Tile metadata includes flag data, such as transparency and/or intensity flag data, indicating whether a given input graphics tile makes less than a predetermined first threshold level of contribution or more than a second predetermined threshold level of contribution to a corresponding output graphics tile. For example, if an input graphics tile is transparent, then its reading from a memory and/or subsequent processing may be suppressed. If a given input graphics tile is opaque, then underlying input graphics tiles that are obscured may have their reading and/or further processing suppressed.

24 Claims, 6 Drawing Sheets

GRAPHICS TILE COMPOSITING CONTROL

This application claims priority to GB Application No. 1314556.0, filed on Aug. 14, 2013, the entire content of which is hereby incorporated by reference.

BACKGROUND

This invention relates to the field of graphics processing. More particularly, this invention relates to tile-based graphics processing in which an image is divided into a number of tiles which are separately processed in turn in order to generate the full frame image.

It is known to provide tile-based graphics processing systems for the purpose of reducing memory bandwidth requirements. The energy and time consumed in reading and writing large volumes of graphics data to and from a main memory may be considerable. Measures which can reduce the amount of memory traffic, or processing performed, in order to generate an output frame of graphics data are desirable.

SUMMARY

Viewed from one aspect the present invention provides apparatus for processing graphics data to generate a plurality of output graphics tiles that together form an output graphics frame, said apparatus comprising:

compositing circuitry configured to combine one or more input graphics tiles for a common tile area to form an output graphics tile for said common tile area;

wherein each one of said one or more input graphics tiles has associated tile flag data; and behaviour modification circuitry configured to read said tile flag data for said one or more input graphics tiles for said common tile area and to control handling of said one or more input graphics tiles in dependence upon tile flag data.

The present technique recognises that by marking input graphics tiles with associated tile flag data it is possible to control the handling of those tiles more efficiently. The flag data may indicate a wide variety of different properties associated with the input graphics tiles that can be used to modify processing of those tiles.

In some embodiments, if the tile flag data indicates that a given input tile has less than a first threshold level of contribution, then it may be that the output graphics tile will be uninfluenced, or influenced to a negligible degree, by that given input graphics tile and accordingly the handling of that input graphics tile may be modified. In a complementary fashion, if the tile flag data indicates that a given input graphics tile has more than a second threshold level of contribution, then this graphics tile may have the effect of making the content of the corresponding output graphics tile independent, or only slightly dependent, upon the content of one or more input graphics tiles that are overlain by the given input graphics tile. In this case, the handling of those other input graphics tiles may be modified to reflect the lack of influence they have on the output graphics tile.

In some embodiments the input graphics tiles are stored in a memory and tile reading circuitry is coupled to the memory and configured to read the graphics tiles from the memory. In this case, one example of behaviour modification may be provided by tile read suppression circuitry coupled to the tile reading circuitry and configured to read the tile flag data for the one or more input graphics tiles for a common tile area and to control whether or not respective ones of the one or more input graphics tiles are read from the memory in dependence upon the tile flag data. In this way, input graphics tiles which have no or little influence upon the output graphics tile may be suppressed from being fetched from memory thereby saving memory bandwidth, processing (e.g. both any manipulation and the compositioning itself), energy and time.

The tile flag data in the form of transparency flag data is provided in addition to pixel-by-pixel transparency data specifying a degree of transparency for each pixel. Such transparency data on a pixel-by-pixel basis is sometimes referred to as alpha plane data.

The tile flag data may also be in the form of intensity flag data used to gate tile reading, or other processing, in the case of compositing operations using additive (e.g. see http://rbwhitaker.wikidot.com/additive-sprites) or multiplicative blending. Depending on the blending used, suppression of tile reading may take place if the tile intensity is all below a first predetermined value or above a second predetermined value. The colour space of the pixels may be any one of: RGB, sRGD and YUV.

The input graphics tiles may comprise colour component pixel values. In such embodiments, the tile read suppression circuitry may be configured to suppress reading of coloured component values of less than a predetermined intensity as these will have no or little effect upon the output graphics tile.

Some embodiments may support chroma-key operation in which certain specific colours should be treated as transparent. The transparency flag data may represent that a tile has a chroma-key colour, is transparent and accordingly need not be read and/or processed Tile flag data indicating that a given input graphics tile makes little contribution, e.g. has above a first threshold level of transparency, may be used to control the read suppression circuitry to suppress reading of at least a portion of that given input graphics tile.

The input graphics tiles may have respective associated priority values indicating a relative ordering with which the input graphics tiles overlie each other. In some embodiments this may be a z-depth value, but in other embodiments, it may be a simple drawing order. In such embodiments, the read suppression circuitry may be configured to respond to a tile flag value indicating more than a second threshold level of contribution of a given input graphics tile to suppress reading of corresponding portions of one or more further input graphics tiles which have priority values indicating that they are overlain by the given input graphics tile. Thus, for example, if an opaque, or substantially opaque, input graphics tile overlies one or more further input graphics tiles, then the reading of those one or more further graphics tiles from the memory may be suppressed as they will have no or little influence upon the output graphics tile to be generated.

The compositing circuitry may perform a number of different functions as well as combining the input graphics tiles. Possible functions performed by the compositing circuitry include a rotation of the input graphics tiles and scaling of the input graphics tiles. Such rotation operations are common on mobile devices where the orientation of the device as held by a user is detected and used to control rotation of the display of that device.

The tile flag data may be conveniently stored as metadata for each of the one or more input graphics tiles. Such metadata may be read and acted upon without the need to read the full data for the input graphics tile.

The metadata may be arranged within a hierarchy of metadata, with each level within the hierarchy representing regions of increasing size within the output graphics frame. Thus, tile flag metadata may be provided on a per tile basis, a per region basis or a per frame basis for a given frame of input graphics tiles.

The metadata including the tile flag data may be conveniently generated when the input graphics tiles are generated. The metadata then stays associated with the input graphics tile and may be used to modify the handling/processing of that input graphics tile in order to achieve grater efficiency.

The tile flag data may be two-bit data indicating for an associated input graphics tile one of that the tile has less than a first threshold level of contribution, that the tile has more than a second threshold level of contribution or that the tile has neither less than the first threshold level of contribution nor more than the second threshold level of contribution.

In some embodiments, the transparency flag data may be indicative of the contribution of the associated complete input graphics tile or separately indicative of the contribution associated with a plurality of portions (regions) of the input graphics tile with the different portions of that input graphics tile then being subject to respective different types of processing/handling dependent upon the level of contribution they have as indicated by their tile data flag.

As discussed above, the behaviour modifying circuitry may in some embodiments serve to suppress reading of input graphics tiles from the memory. In other embodiments the behaviour modifying circuitry may comprise processing suppression circuitry configured to read the tile flag data for the input graphics tiles and use this to selectively suppress at least some processing operations for respective input graphics tiles in dependence upon their tile flag data.

Viewed from another aspect the present invention provides apparatus for processing graphics data to generate a plurality of output graphics tiles that together form an output graphics frame, said apparatus comprising:

compositing means for combining one or more input graphics tiles for a common tile area to form an output graphics tile for said common tile area;

wherein each one of said one or more input graphics tiles has associated tile flag data; and behaviour modification means for reading said tile flag data for said one or more input graphics tiles for said common tile area and for controlling handling of said one or more input graphics tiles in dependence upon tile flag data.

Viewed from a further aspect the present invention provides a method of processing graphics data to generate a plurality of output graphics tiles that together form an output graphics frame, said method comprising the steps of:

compositing one or more input graphics tiles for a common tile area to form an output graphics tile for said common tile area;

wherein each one of said one or more input graphics tiles has associated tile flag data; and reading said tile flag data for said one or more input graphics tiles for said common tile area; and controlling handling of said one or more input graphics tiles in dependence upon tile flag data.

The above, and other objects, features and advantages of this invention will be apparent from the following detailed description of illustrative embodiments which is to be read in connection with the accompanying drawings.

DESCRIPTION OF EMBODIMENTS

Figure 1:
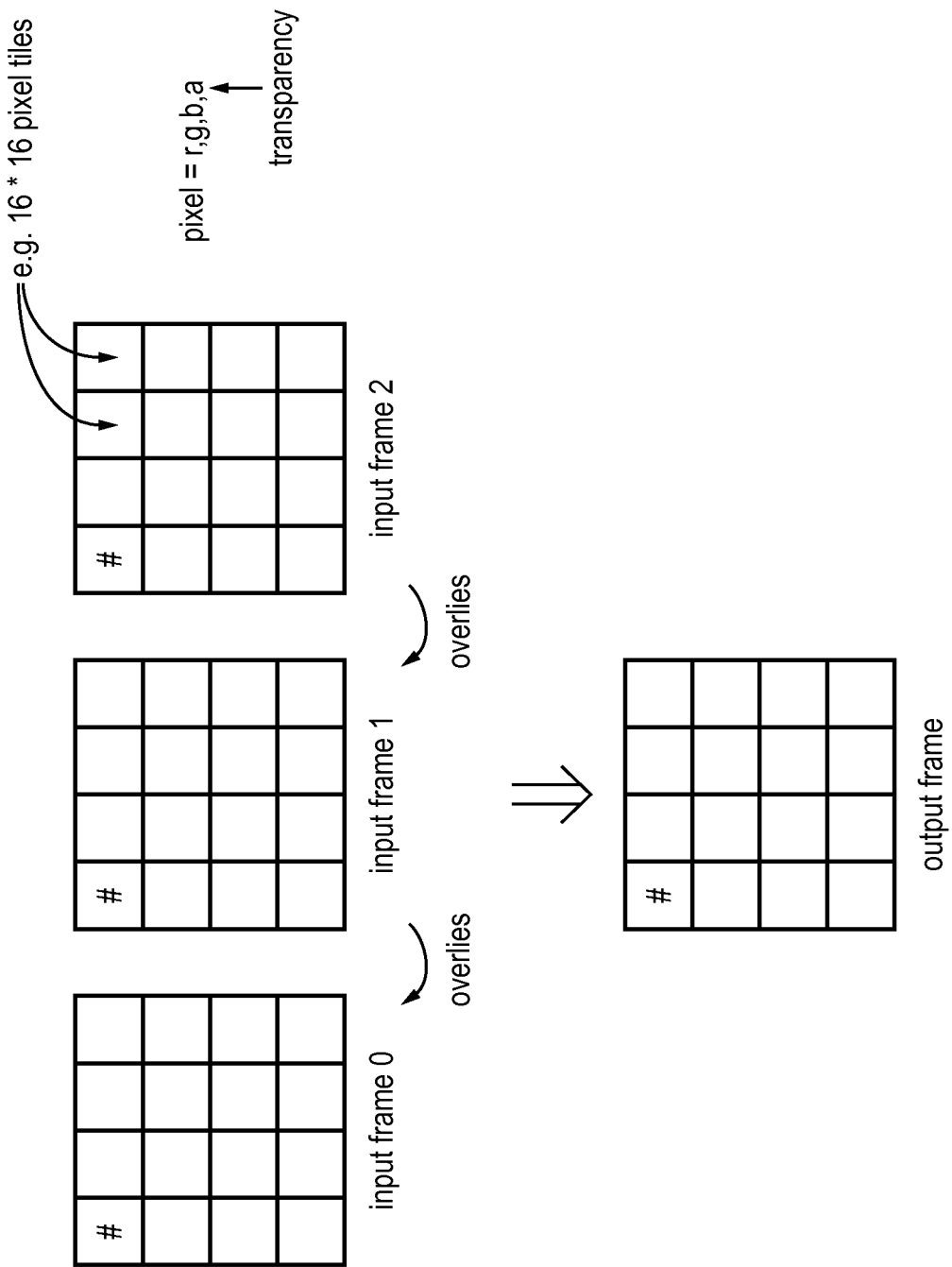
FIG. 1 schematically illustrates combining a plurality of layers of input graphics tiles to form an output graphics frame comprising multiple output graphics tiles.

FIG. 1 schematically illustrates a plurality of input frames, each comprising a plurality of input graphics tiles. The input graphics tiles, in this example, contain 16*16 pixels. Each pixel has associated red green and blue pixel values together with a transparency (or alpha plane) value. In some embodiments, the pixel colour component values may be pre-multiplied by the associated transparency value. In such circumstances, the behaviour modification circuitry (e.g. read suppression circuitry) may be arranged to suppress the reading, or other processing, of pre-multiplied colour component values with less than a predetermined intensity as these will make little or no contribution to (impact on) the corresponding pixels within the output frame.

Illustrated in FIG. 1 is the relative ordering of the input frames whereby input frame 2 overlies (in at least the sense of being drawn after) input frame 1, which in turn overlies input frame 0. This ordering may be represented by priority values associated with each input frame.

The input frames are combined in a compositing operation on a tile-by-tile basis. Accordingly, the respective corresponding input graphics tiles (e.g. marked with a #) are combined as they correspond to a common area so as to form an output graphics tile for that common area also marked with a #. The different layers/surfaces need not be the same size or completely overlap each other. The tiles need not be aligned between layers and one output tile may depend upon several adjacent input tiles within the same layer.

Figure 2:
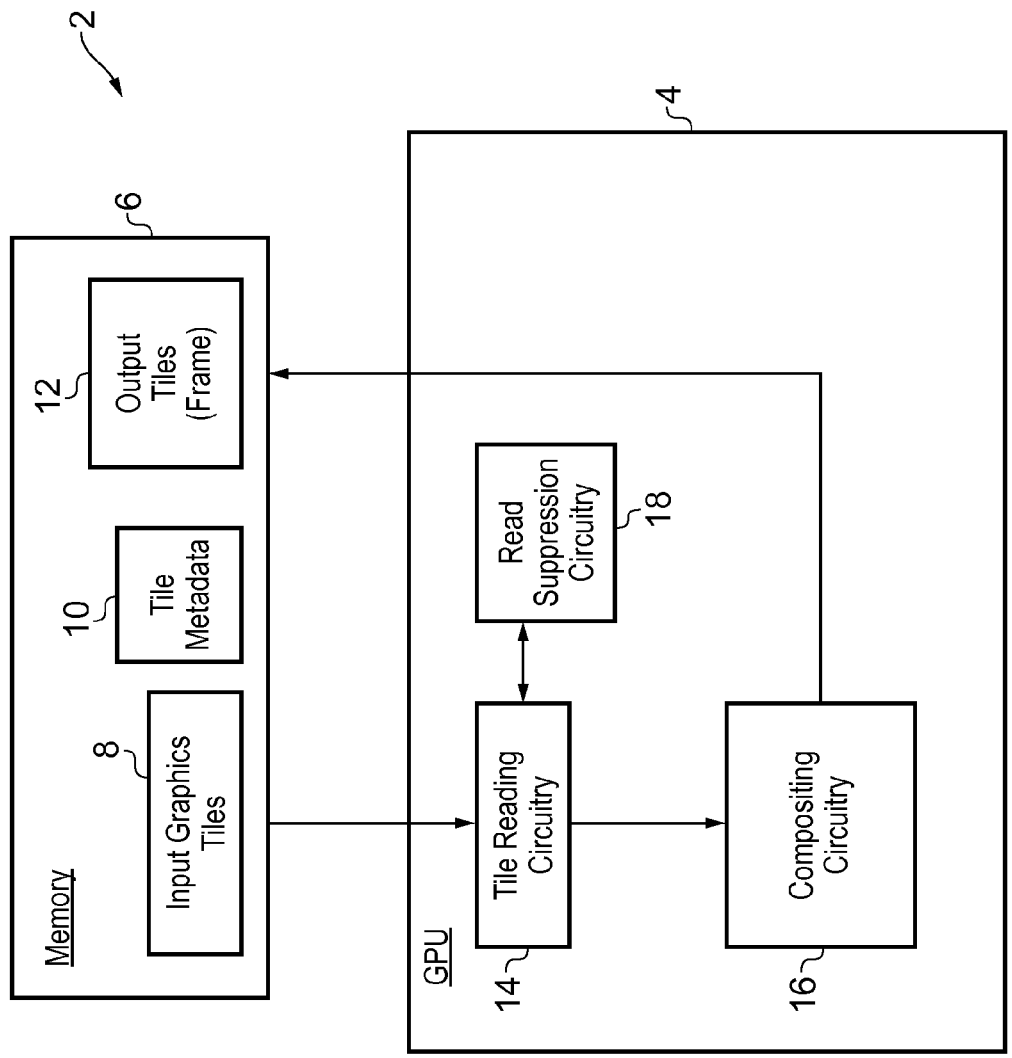
FIG. 2 schematically illustrates a graphics processing unit configured to read input graphics tiles from a memory.

FIG. 2 schematically illustrates apparatus for processing graphics data 2 comprising a graphics processing unit 4 and a memory 6. The memory 6 stores input graphics tiles 8, tile metadata (including the flag data such as tile transparency data and/or tile intensity data) 10 and output tiles (which together form an output frame) 12. The graphics processing unit includes many further circuit elements other than those illustrated in FIG. 2, These further circuit elements will be familiar to those in this technical field have been omitted from FIG. 2 for the sake of clarity.

The graphics processing unit 4 includes tile reading circuitry 14, compositing circuitry 16, and read suppression circuitry 18. In operation, the tile reading circuitry 14 reads tile metadata 10 including, in this example embodiment, the transparency flag data for input graphics tiles 8, which are to be subject to composition. The read suppression circuitry 18 analyses the transparency flag data and determines whether or not the handling of given input graphics tiles may be modified so as to improve efficiency. For example, if a given input graphics tile has a transparency flag data indicating that it has more than a first threshold level of transparency (e.g. is completely transparent or only slightly non-transparent), then reading of that given input graphics tile form the memory 6 may be suppressed. Another form of read suppression may arise when a given input graphics tile has transparency flag data indicating that it has a greater than a second threshold level of transparency (e.g. completely or substantially opaque) whereupon the reading of any further input graphics tiles which are overlain (drawn before) by that opaque or substantially opaque graphics tile may be suppressed.

The transparency flag data could represent chroma-key data, i.e. indicate that some or all the pixels of a tile match a chroma-key colour and should be processed/handled as transparent. A tile may be identified as matching the chroma-key colour and have its transparency flag data set up in this way when the tile is generated. A tile may have some pixels matching the chroma-key colour and its remaining pixels, with greater than a threshold level of transparency, and therefore none of the pixels will contribute to the output tile and so fetching of that tile may be suppressed.

When the read suppression circuitry 18 has identified which input graphics tiles 8 should be read, then the tile reading circuitry 14 fetches these input graphics tiles from the memory 6 and supplies them to the compositing circuitry 16 where they are combined in accordance with their priority ordering and their respective different levels of pixel-by-pixel transparency so as to form an output graphics tile which is stored within the memory 6 to form an output graphics frame. An alternative composition scheme would be that the composited frame is not written to the memory 6, but is instead sent directly to a display controller; as for example, a compositing display controller.

Figure 3:
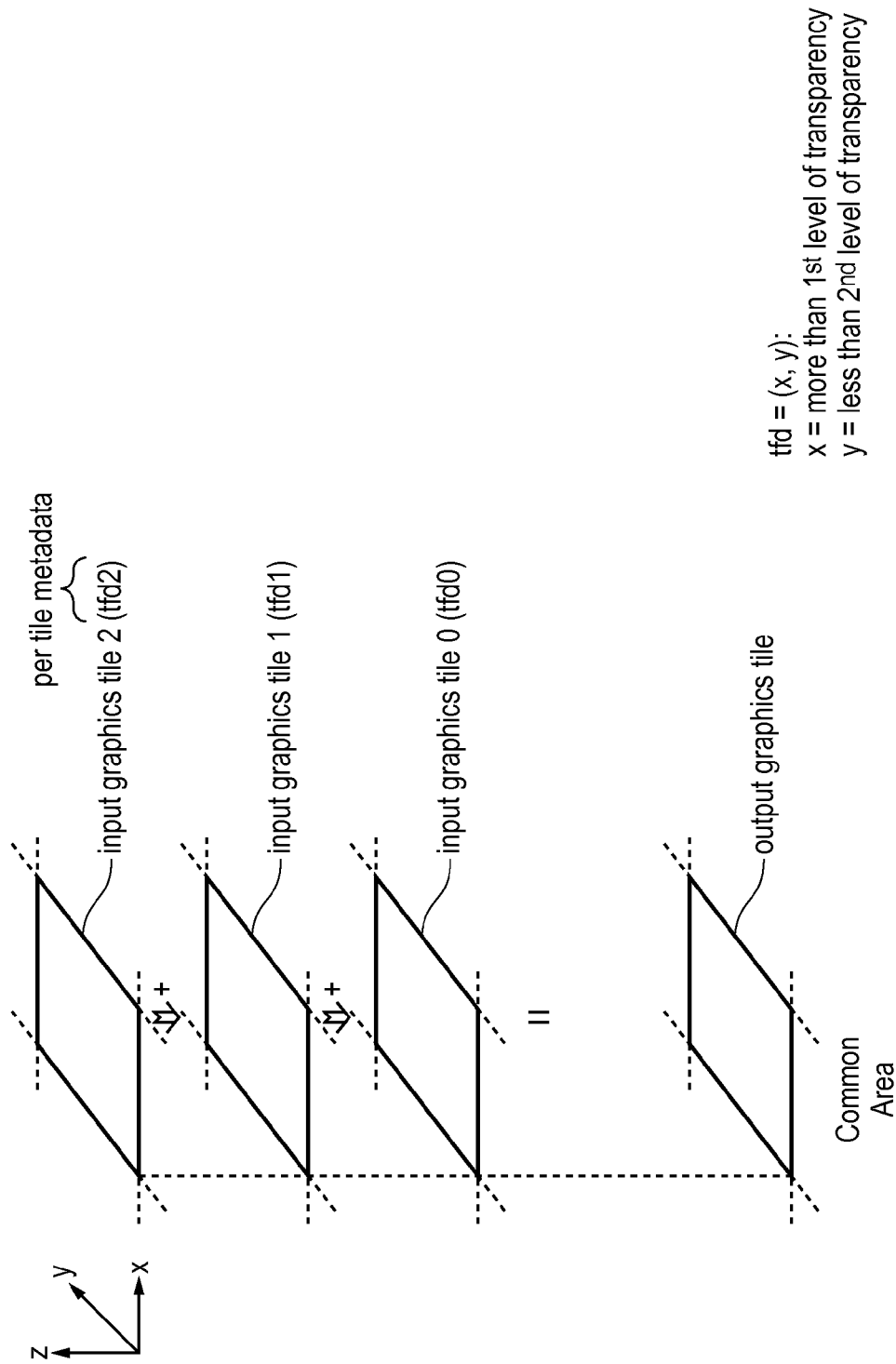
FIG. 3 schematically illustrates the compositing of three input graphics tiles to form an output graphics tile all associated with a common area within the output frame.

FIG. 3 schematically illustrates the compositing processing performed upon three input graphics tiles to generate a corresponding output graphics tile all corresponding to a common area within the output graphics frame. Each of the input graphics tiles has respective per-tile metadata including transparency flag data tfd0, tfd1 and tfd2. This transparency flag data comprises two-bit data with a first bit indicating if the corresponding tile has more than a first threshold level of transparency and a second bit indicating whether the input graphics tile has less than a second threshold level of transparency (e.g. is opaque). If neither of these flags is set, then the processing of that input graphics tile will proceed normally. However, if either of these transparency flag data bits is set, then this will be used to control the processing of either the input graphics tile bearing that transparency flag data or one or more other input graphics tiles for that common area.

Alpha plane transparency values that are not totally opaque or transparent (e.g. 0 or 255) will reduce the intensity of overlain tiles/layers. The colour values of the tile with given transparency value will also be reduced (multiplied) by that transparency value and so some of these colour values may become very small such that their effect on the output tile is so small it can be ignored and reading of that colour data suppressed. The transparency flag data may include flags indicating that reading of colour data may be suppressed as the resulting colour component values will be below a threshold level.

As well as alpha-blending in dependence upon transparency value, the present techniques may also be applied to embodiments using other modes of composition, such as additive and multiplicative blending. In such embodiments the tile flag data may be intensity flag data indicative of one or more of the intensity being less than a first threshold level of intensity and/or more than a second threshold level of intensity. The role of intensity (black and white) is analogous to that of transparency in the case of additive blending, i.e. high intensity white makes a large contribution, and is inverted in the case of multiplicative blending. Intensity values may be, in some but not all embodiments, modulated by corresponding transparency values before comparison with the first and second threshold values, e.g. a medium intensity tile may also have a high transparency resulting in an intensity contribution that is sufficiently low that fetching of that tile is suppressed. The intensity flag value may be dependent upon intensity either pre or post such transparency processing.

Both transparency flag data and/or intensity flag data represent the level of contribution an input graphics tile will have to a corresponding output graphics tile. This level of contribution can be used to gate input tile reading or other tile processing operations.

Figure 4:
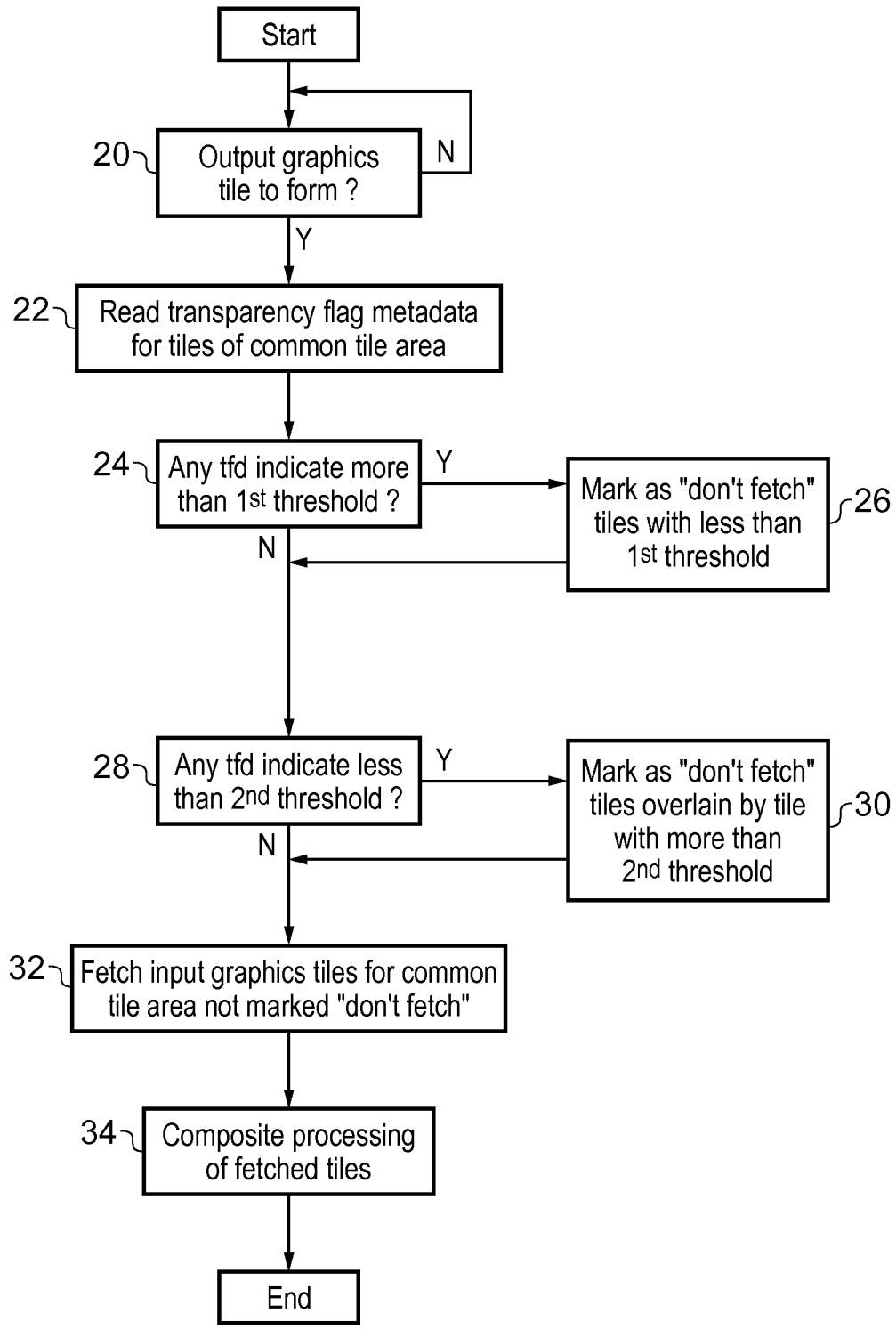
FIG. 4 is a flow diagram schematically illustrating the use of tile flag data (e.g. transparency flag data) to suppress fetching of input graphics tiles.

FIG. 4 is a flow diagram schematically illustrating how the transparency flag data may be used to suppress reads of input graphics tiles from the memory 6. At step 20 processing waits until there is an output graphics tile ready to form. Step 22 reads the transparency flag metadata for all of the input graphics tiles which correspond to the common tile area of the output graphics tile to be formed. Step 24 then identifies if any of the input graphics tiles has transparency flag data indicating that it has more than a first threshold level of transparency. Any such input graphics tiles having more than a first threshold level of transparency are marked as "don't fetch" at step 26. Step 28 then determines whether any of the input graphics tiles has transparency flag data indicating that it has less than a second threshold level of transparency. If any of the input graphics tiles has transparency flag data indicating that it has less than a second threshold level of transparency, then step 30 serves to mark as "don't fetch" any input graphics tiles overlain by the given input graphics tile (e.g. as indicated by respective priority values or Z depth values etc) at step 30. At step 32, the tile reading circuitry 14 fetches the full input graphics tiles from the memory 6 for composition processing providing they are not marked as "don't fetch". Step 34 then performs the composition processing on the fetched tiles to generate the output graphics tile.

Figure 5:
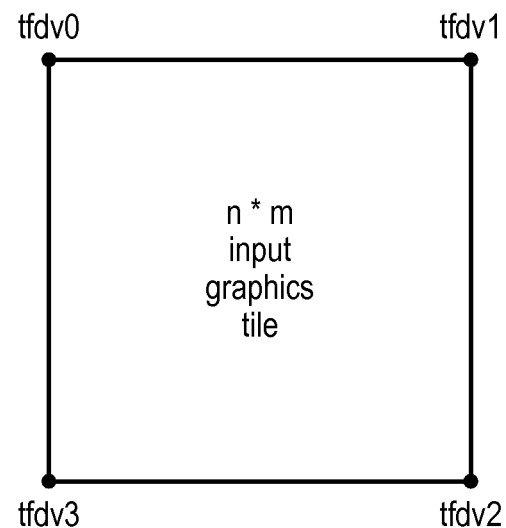
FIG. 5 schematically illustrates an input graphics tile having separate tile flag data associated with respective portions thereof.

FIG. 5 schematically illustrates an embodiment in which instead of or in addition to, having a tile transparency flag data, a tile may have per-portion transparency flag data with a transparency flag data value associated with each portion of a square tile. These portion transparency flag data values tfdp0, tfdp1, tfdp2, tfdp3 may be used to control the processing of the pixel values of that portion in accordance with the above described techniques, such as suppressing the fetching of such pixel values from the memory 6.

Figure 6:
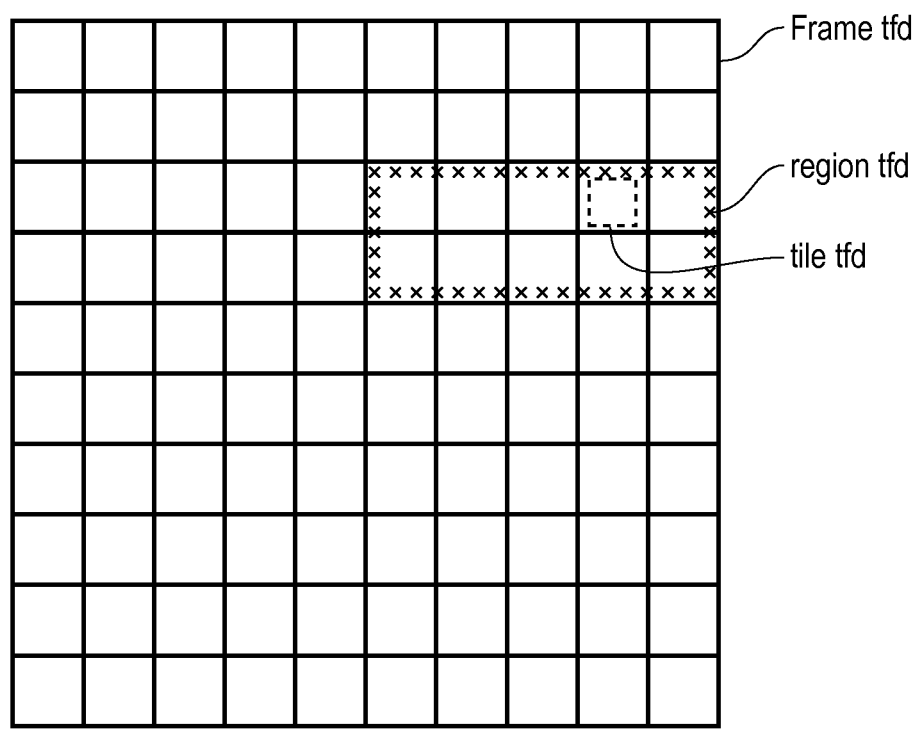
FIG. 6 schematically illustrates tile flag data in the form of metadata within a hierarchy of metadata with levels respectively corresponding to a tile, a region and a frame.

FIG. 6 illustrates how the transparency flag data may be provided within a hierarchy of metadata for an input frame. This hierarchy may start at a per-tile level with tile transparency flag data (possibly below this with vertex transparency flag data) and then progresses to region transparency flag data for a region comprising multiple tiles. Finally, there is frame transparency flag data which could be used to indicate that, for example, an entire input frame was transparent or completely opaque.

Figure 7:
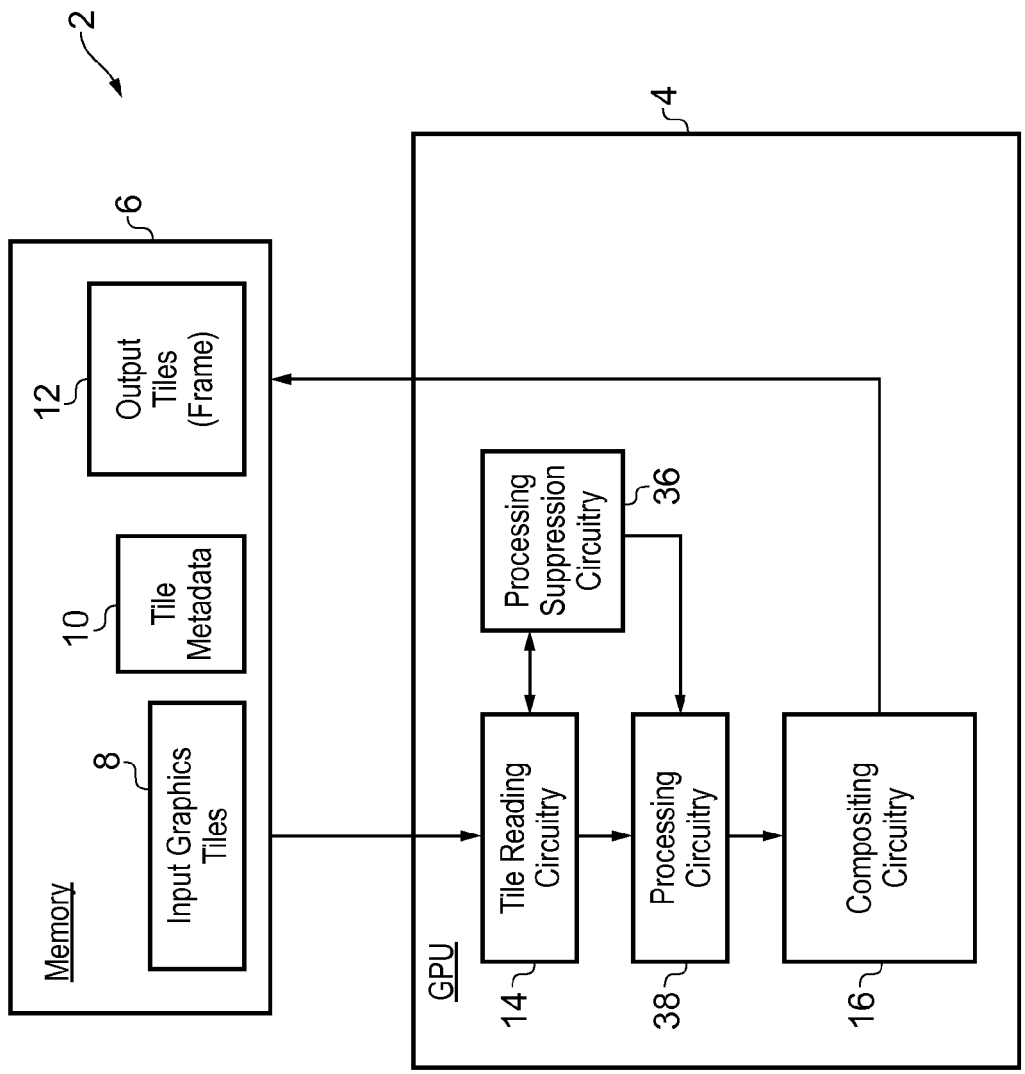
FIG. 7 schematically illustrates another example embodiment in which the tile flag data is used to suppress processing operations performed upon input graphics tiles fetched from a memory by a graphics processing unit.

FIG. 7 schematically illustrates an alternative example embodiment. In this embodiment the transparency flag data read as part of the tile metadata is used by processing suppression circuitry 36 to selectively suppress processing operations performed by processing circuitry 38 for input graphics tiles which are either transparent (or with more than a predetermined first threshold level of transparency) or for overlain (obscured) input graphics tiles which lie under an input graphics tile with transparency flag data indicating that it is opaque or that less than a second predetermined threshold level of transparency. The processing circuitry 38 which is selectively suppressed for certain input graphic tiles may perform processing operation such as rotation and/or scaling. This rotation and/or scaling may not be necessary if the tile is either too transparent or is overlain by an opaque tile. In this case, suppression of this processing activity saves energy and time. The action (processing) of the compositing circuitry 16 can also be suppressed for such tiles.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing graphics data to generate a plurality of output graphics tiles that together form an output graphics frame, said apparatus comprising:
   compositing circuitry configured to combine one or more input graphics tiles for a common tile area to form an output graphics tile for said common tile area;
   wherein each one of said one or more input graphics tiles has associated tile flag data;
   behavior modification circuitry configured to read said tile flag data for said one or more input graphics tiles for said common tile area and to control handling of said one or more input graphics tiles in dependence upon tile flag data; and
   said associated tile flag data is indicative of one or more of:
   (i) said input graphics tile makes less than a first threshold level of contribution to said output graphics tile; and
   (ii) said input graphics tile makes more than a second threshold level of contribution to said output graphics tile.

2. Apparatus as claimed in claim 1, further comprising:
   a memory configured to store input graphics tiles; and
   tile reading circuitry coupled to said memory and configured to read said input graphics tiles from said memory; wherein
   said behavior modification circuitry comprises tile read suppression circuitry coupled to said tile reading circuitry and configured to read said tile flag data for said one or more input graphics tiles for said common tile area and to control whether or not respective ones of said one or more input graphics tiles are read from said memory in dependence upon tile flag data.

3. Apparatus as claimed in claim 1, wherein said tile flag data is transparency flag data indicative of one or more of:
   (i) more than a first threshold level of transparency of at least a portion of said input graphics tile; and
   (ii) less than a second threshold level of transparency of at least a portion of said input graphics tile.

4. Apparatus as claimed in claim 3, wherein at least one of said input graphics tiles stored in said memory includes pixel-by-pixel transparency data independently specifying a degree of transparency for each pixel, said degree of transparency controlling blending of input graphics tiles by said compositing circuitry.

5. Apparatus as claimed in claim 4, wherein said pixel-by-pixel transparency data is stored in as separate alpha plane data for each pixel of an input graphics tile.

6. Apparatus as claimed in claim 1, wherein said tile flag data is intensity flag data indicative of one or more of:
   (i) less than a first threshold level of intensity of at least a portion of said input graphics tiles; and
   (ii) more than a second threshold level of intensity of at least a portion of said input graphics tile.

7. Apparatus as claimed in claim 6, wherein intensity values of pixels within said input graphics tile are modulated by transparency values before comparison with said first threshold level and said second threshold level.

8. Apparatus as claimed in claim 7, wherein said input graphics tiles comprise color component pixel values and said tile read suppression circuitry is configured to suppress reading of tiles with color component values of one of less than a first predetermined intensity and more than a second predetermined intensity.

9. Apparatus as claimed in claim 8, wherein the pixel values are in a pixel color space that is one of: RGB, sRGB and YUV.

10. Apparatus as claimed in claim 1, wherein said read suppression circuitry is configured to respond to a tile flag indicating less than said first threshold level of contribution of at least a portion of a given first input graphics tile by suppressing reading of said at least a portion of said first given input graphics tile.

11. Apparatus as claimed in claim 1, wherein said one or more input graphics tiles have respective associated priority values indicating a relative ordering with which said one or more input graphics tiles overlie each other.

12. Apparatus as claimed in claim 11, wherein said read suppression circuitry is configured to respond to a tile flag indicating more than said second threshold level of contribution of at least a portion of a second given input graphics tile by suppressing reading of at least a portion of any of said one or more input graphics tiles having a priority value indicating they are overlain by said at least a portion of said second given input graphics tile.

13. Apparatus as claimed in claim 1, wherein said compositing circuitry is configured to perform at least one of a rotation operation upon said one or more input graphics tiles, and a scaling operation upon said one or more input graphics tiles.

14. Apparatus as claimed in claim 1, wherein said tile flag data indicates that said input graphics tile has at least some pixels with a color matching a chroma-key color and accordingly has less than said first threshold level of contribution.

15. Apparatus as claimed in claim 14, wherein all pixels of said input graphics tile have a color matching said chroma-key color.

16. Apparatus as claimed in claim 15, wherein said metadata includes a flag indicating that color data for said input graphics tiles need not be fetched for processing.

17. Apparatus as claimed in claim 1, wherein said tile flag data is stored as metadata for each of said one or more input graphics tiles.

18. Apparatus as claimed in claim 17, wherein said metadata for each of said one or more input graphics tiles is part of a hierarchy of metadata, each level in said hierarchy corresponding to regions of increasing size within said output graphics frame.

19. Apparatus as claimed in claim 17, wherein said metadata is generated when said input graphics tiles are generated.

20. Apparatus as claimed in claim 1, wherein said tile flag data comprises two-bit data indicating one of:
   (i) less than said first threshold level of contribution;
   (ii) more than said second threshold level of contribution; and
   (iii) neither less than said first threshold level of contribution nor more than said second threshold level of contribution.

21. Apparatus as claimed in claim 1, wherein said tile flag data is indicative of a contribution of one of:
   (i) a complete input graphics tile; and
   (ii) a plurality of portions of an input graphics tile.

22. Apparatus as claimed in claim 1, wherein said behavior modifying circuitry comprises processing suppression circuitry configured to read said tile flag data for said one or more input graphics tiles for said common tile area and to control whether or not respective ones of said one or more input graphics tiles are excluded from at least some processing operations in dependence upon tile flag data.

23. Apparatus for processing graphics data to generate a plurality of output graphics tiles that together form an output graphics frame, said apparatus comprising:
   compositing means for combining one or more input graphics tiles for a common tile area to form an output graphics tile for said common tile area;
   wherein each one of said one or more input graphics tiles has associated tile flag data;
   behavior modification means for reading said tile flag data for said one or more input graphics tiles for said common tile area and for controlling handling of said one or more input graphics tiles in dependence upon tile flag data; and
   said associated tile flag data is indicative of one or more of:
   (i) said input graphics tile makes less than a first threshold level of contribution to said output graphics tile; and
   (ii) said input graphics tile makes more than a second threshold level of contribution to said output graphics tile.

24. A method of processing graphics data to generate a plurality of output graphics tiles that together form an output graphics frame, said method comprising the steps of:
   compositing one or more input graphics tiles for a common tile area to form an output graphics tile for said common tile area;
   wherein each one of said one or more input graphics tiles has associated tile flag data; and
   reading said tile flag data for said one or more input graphics tiles for said common tile area; and
   controlling handling of said one or more input graphics tiles in dependence upon tile flag data; and wherein said associated tile flag data is indicative of one or more of:
   (i) said input graphics tile makes less than a first threshold level of contribution to said output graphics tile; and
   (ii) said input graphics tile makes more than a second threshold level of contribution to said output graphics tile.

* * * * *